United States Patent [19]

Mills, Jr.

[11] 4,266,126
[45] May 5, 1981

[54] PULSED RADIATION DECAY LOGGING

[75] Inventor: William R. Mills, Jr., Duncanville, Tex.

[73] Assignee: Mobil Oil Corporation, Fairfax, Va.

[21] Appl. No.: 51,567

[22] Filed: Jun. 25, 1979

[51] Int. Cl.³ .............................................. G01V 5/00
[52] U.S. Cl. .................................... 250/264; 250/269
[58] Field of Search ................ 250/262, 264, 269, 270

[56] References Cited

U.S. PATENT DOCUMENTS

| | | | |
|---|---|---|---|
| 3,379,884 | 4/1968 | Youmans | 250/269 |
| 3,800,150 | 3/1974 | Givens | 250/269 |
| 4,004,147 | 1/1977 | Allen | 250/262 |
| 4,020,342 | 4/1977 | Smith, Jr. et al. | 250/262 |
| 4,097,737 | 6/1978 | Mills, Jr. | 250/269 |

*Primary Examiner*—Alfred E. Smith
*Assistant Examiner*—Janice A. Howell

*Attorney, Agent, or Firm*—Charles A. Huggett; Michael G. Gilman; George W. Hager

[57] ABSTRACT

Methods and apparatus for radioactive well logging in which the formation is irradiated with bursts of primary radiation and the resulting secondary radiation is measured during a plurality of time windows occurring subsequent to the primary radiation burst. A plurality of ratio functions are established which are representative of the radiation count rates measured during adjacent pairs of the time windows. The ratio functions are compared with each other and at least one ratio function is selected. The selected ratio function is employed to generate a signal representative of the decay rate of the secondary radiation. The invention may be employed in epithermal neutron decay logging and at least a portion of the time windows may be of successively greater lengths.

9 Claims, 5 Drawing Figures

PULSED RADIATION DECAY LOGGING

BACKGROUND OF THE INVENTION

This invention relates to radioactive well logging and more particularly to well logging processes and systems for irradiating subterranean formations under investigation with a primary burst of radiation and characterizing the formation on the basis of the decay of the subsequently produced secondary radiation.

Various pulsed radiation techniques may be employed in order to characterize subterranean formations with regard to their mineral content or lithologic characteristics, such as porosity, or to provide for stratigraphic correlation. In these techniques, a formation under investigation is irradiated with a burst of primary radiation and the resulting secondary radiation is measured during two or more successive time windows in order to determine decay characteristics such as mean or half lives or various macroscopic nuclear cross sections.

Exemplary of such techniques are pulsed neutron logging procedures in which the formations are irradiated with repetitive bursts of fast neutrons, normally neutrons exhibiting an energy greater than 1 Mev. When the fast neutrons enter the formation, they are moderated, or slowed down, by nuclei within the formation to form lower energy neutron populations. The fast neutrons are moderated to lower energy levels by the nuclear collision processes of elastic and inelastic scattering. In elastic scattering the neutron loses a portion of its energy in a collision that is perfectly elastic, i.e., the energy lost by the neutron is acquired as kinetic energy by the nucleus with which it collides. In inelastic scattering only some of the energy lost by the neutron is acquired as kinetic energy by the nucleus with which it collides. The remaining energy loss generally takes the form of a gamma ray emitted from the collision nucleus.

In the course of moderation, the neutrons reach the epithermal range and thence are further moderated until they reach the thermal neutron range. Thermal neutrons are neutrons which are in thermal equilibrium with their environment. The distribution in speed of thermal neutrons follows so-called Maxwellian distribution law. The energy corresponding to the most probable speed for a temperature of 20° C. is 0.025 electron volt. Epithermal neutrons are those neutrons which exhibit energies within the range from immediately above the thermal neutron region to about 100 electron volts. While the boundary between thermal and epithermal neutrons is, of necessity, somewhat arbitrary it is normally placed between about 0.1–1 electron volt.

The populations of neutrons at the various energy levels decay with time following primary irradiation and thus offer means of characterizing the formation. For example, in the case of elastic scattering, which predominates below energies of about 1 Mev, the number of collisions required for a neutron to moderate from one energy level to a second lower energy level varies more or less directly with the atomic weight of the nuclei available for collision. In subterranean formations, hydrogen nuclei present in hydrogenous materials such as oil, water, and gas tend to predominate in the slowing down process. Thus, the rate of decay of the epithermal neutron population gives a quantitative indication of the amount of hydrogenous material present which in turn may be indicative of the porosity of the formation.

Once the neutrons reach the thermal energy range they diffuse through the formation until they are captured by nuclei. The capture of thermal neutrons is attended by the emission of gamma rays. The propensity for thermal neutron capture within a formation is indicated by the macroscopic capture cross section of the formation which is determined by the microscopic capture cross section of the various constituent elements within the formation. Of the various elements typically encountered in subterranean formations chlorine exhibits a relatively high capture cross section and thus its presence in the formation is attended by a relatively high macroscopic capture cross section. Accordingly, the macroscopic capture cross section of the formation, which is inversely proportional to the mean life of thermal neutrons in the formation, may be measured in order to characterize the formation with regard to its chlorine content and thus the salinity of fluids therein.

In view of the foregoing it will be recognized that various advantages may derive from the measurement of secondary radiations such as neutrons of various energy levels or gamma rays resulting from inelastic scattering or thermal neutron capture. For example, U.S. Pat. No. 3,379,884 to Youmans discloses a well logging technique in which a formation under investigation is irradiated with bursts of fast neutrons and the decay of the resulting thermal neutron population measured by detecting thermal neutrons or gamma rays associated with thermal neutron capture during a plurality of time windows subsequent to the neutron bursts. The ratio of the count rates measured during two time windows is recorded with depth in order to give an indication of the decay of the thermal neutron population.

U.S. Pat. No. 3,800,150 to Givens discloses another pulsed neutron logging technique in which epithermal neutron decay or thermal neutron decay is measured employing time windows for detection which partially overlap each other. Thus in the case of the measurement of epithermal neutron decay, the measurement windows may exhibit durations on the order of 20 microseconds with the first time window starting during or immediately upon termination of the fast neutron burst and the second time window beginning perhaps 10 microseconds after the start of the first time window and extending to 10 microseconds after termination of the first time window.

SUMMARY OF THE INVENTION

In accordance with the present invention, there are provided new and improved well logging processes and systems wherein the detection of secondary radiation is accomplished during a plurality of time windows in a manner to accurately characterize the decay rate of the secondary radiation. The system of the present invention comprises a well logging tool having a primary pulsed radiation source which emits repetitive time-spaced bursts of primary radiation and detector means for detecting secondary radiation resulting from the primary radiation and producing output signals in response to the detected radiation. A plurality of measuring channels are provided, each of which produces a count rate function representative of signals received from the detector means during successive time windows occurring between the primary radiation bursts.

The logging system further comprises means responsive to the measuring channels for producing a plurality of functions representative of the ratios of the radiation count rates measured during adjacent pairs of the time windows. Comparator means function to compare the ratio functions and select at least one of the ratio functions to generate a signal representative of the decay rate of the secondary radiation.

In a preferred embodiment of the invention, a formation under investigation is irradiated with a burst of fast neutrons. The fast neutrons are moderated within the formation to form a population of lower energy neutrons. Radiation attendant to this lower energy neutron population is measured to arrive at radiation count rates for each of a plurality of time windows occurring subsequent to the fast neutron burst. A plurality of ratio functions are established which are representative of the ratios of the radiation count rates measured during adjacent pairs of time windows. These ratio functions are compared with another and at least one ratio function is selected and employed to generate a signal representative of the decay rate of the lower energy neutron population. This decay rate signal is recorded in correlation with depth.

DESCRIPTION OF SPECIFIC EMBODIMENTS

Secondary radiation induced in a subterranean formation as a result of a primary radiation burst may be characterized as decreasing in time in accordance with the following relationship:

$$N_2 = N_1 e^{-\lambda t} \tag{1}$$

wherein:

$N_1$ is the number of radiation events present at a first time $t_1$, $N_2$ is the number of radiation events present at a second later time $t_2$, e is the Napierian base 2.7183, t is the time interval between $t_1$ and $t_2$, and $\lambda$ is a decay constant.

Equation (1) can be solved for the value of the decay constant $\lambda$ as follows:

$$\lambda = (\ln N_1 - \ln N_2)/t = \ln\left(\frac{N_1}{N_2}\right) /t \tag{2}$$

From an examination of equation (2) it can be seen that the relationship between the logarithm of the count rate and time is linear. Thus the decay constant may be determined by subtracting the logarithm of the radiation count obtained at one time from the logarithm of the radiation count obtained at an earlier time or by simply taking the logarithm of the ratio of the radiation counts obtained at different times. However, in many cases, only a portion of the induced secondary radiation actually obeys equation (1). For example, as disclosed in U.S. Pat. No. 4,097,737 to Mills, in carrying out epithermal neutron die-away measurements for porosity logging, the semilog plot of the die-away curve is substantially linear only over a portion of the epithermal neutron decline period. Over this portion, the decay rate of the epithermal neutrons in the formation can be determined by obtaining count rates within two time windows. However, if the count rates are not obtained over the linear portion, the logging system produces an erroneous indication of the decay constant $\lambda$. In order to avoid such erroneous indication, the patent to Mills discloses a reference technique which ensures that the decay rate is determined over a substantially linear portion of the semilog decline curve. This technique involves establishing a plurality of ratio functions from the count rates determined during each of a plurality of successive time windows and comparing these ratio functions with a predetermined reference level.

The present invention provides a method and apparatus for ensuring that the decay rate is determined over a substantially linear portion of the decline curve, i.e. the portion that obeys equation (1) above, by establishing a plurality of ratio functions from the count rates determined during each of a plurality of time windows and comparing these ratio functions with each other to identify the ratio functions associated with time windows falling on the linear portion of the decline curve.

Figures 1, 2:
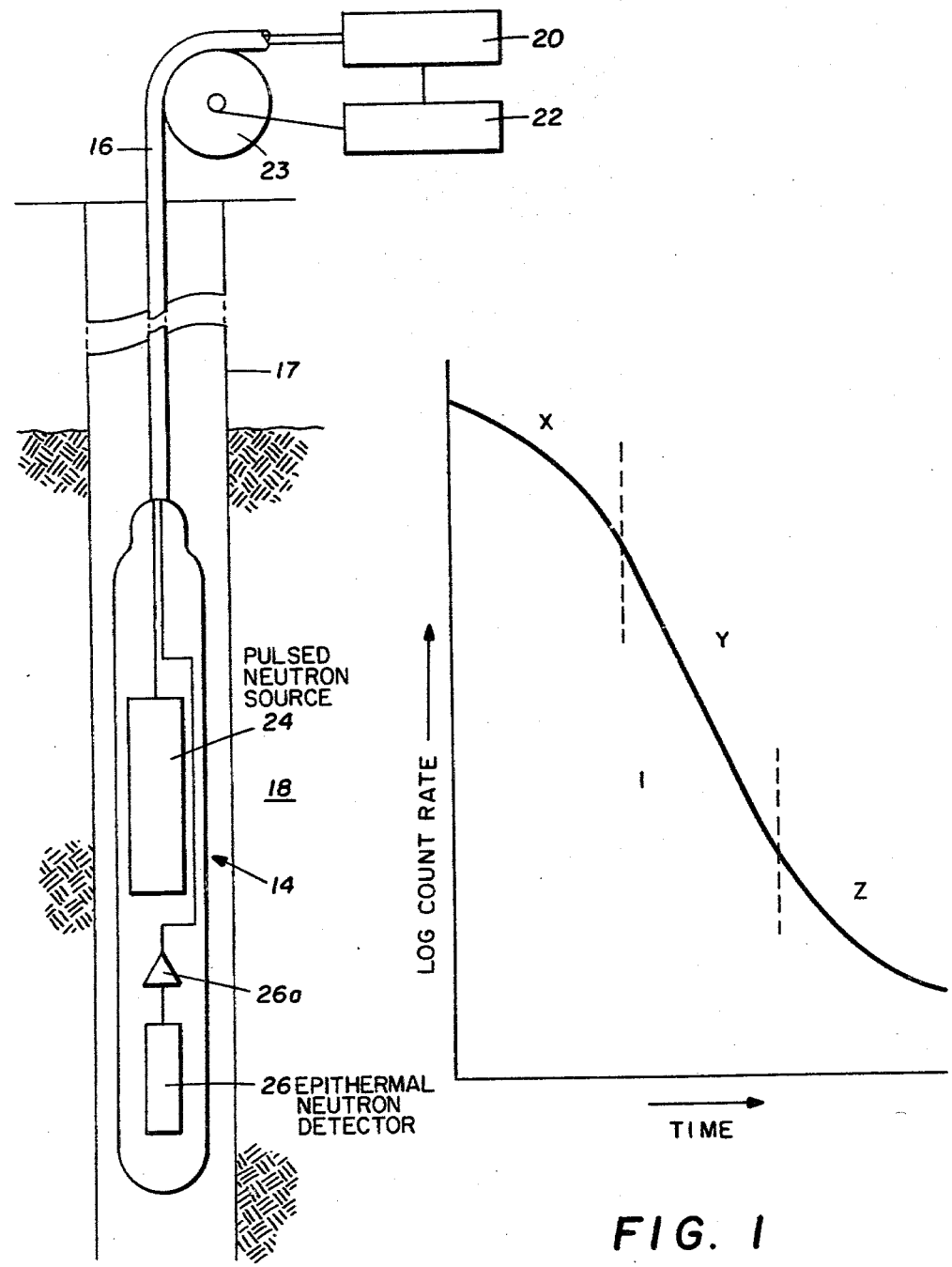
FIG. 1 is a graph illustrating different portions of a decay curve of induced secondary radiation.
FIG. 2 is a schematic illustration showing a logging system embodying the present invention.

Turning now to the drawings, FIG. 1 is a graph illustrating the die-away curve of secondary radiation in a formation resulting from a primary radiation burst. In FIG. 1, the die-away curve 1 is a plot of the log of the radiation count rate on the ordinate versus time plotted on the abscissa. Curve 1 presents a generalized case and thus no units are shown. However, the curve may cover several tens to several hundreds of microseconds in the case of epithermal neutron decay, and up to about a thousand microseconds or more as in the case, for example, of thermal neutron decay. In any event, the die-away curve exhibits an early portion X during which the slope of the curve progressively increases in absolute value, an intermediate portion Y during which the slope of the curve is substantially constant, and a latter portion Z during which the slope of the curve progressively decreases in absolute value. By measuring the radiation count rate at several different times, the decay constant $\lambda$ can be determined provided that the count rate measurements are made at times falling within the straight line portion Y of the die-away curve. This, of course, cannot be determined in advance since the time constant of the die-away curve is the parameter which is determined in order to arrive at the desired measurement. For example, in the case of epithermal neutron decay porosity logging a formation of very low porosity will result in epithermal neutron decay such that the curve 1 would last for 100 to 200 microseconds. However, in the case of a high porosity formation, the curve 1 would have a duration of perhaps 30 to 50 microseconds. It thus can be seen that a pair of time windows spaced subsequent to a fast neutron burst to fall within the linear portion Y of the curve for a low porosity formation would occur after the epithermal neutron decay period for a high porosity formation.

It further can be seen from an examination of FIG. 1 that if radiation count rates are obtained at three successive and equal times, occurring within portion Y, the ratios of count rates obtained at adjacent times are equal. Thus, assuming count rates $CR_1$, $CR_2$, and $CR_3$ obtained at successive times $T_1$, $T_2$, and $T_3$, respectively, occuring within portion Y of curve 1, then the relationship between the several count rates may be characterized as follows:

$$\frac{CR_1}{CR_2} = \frac{CR_2}{CR_3} \quad (3)$$

If the times $T_1$, $T_2$, and $T_3$ occur within the early portion X of the curve, then the count rate relationships may be expressed as follows:

$$\frac{CR_1}{CR_2} < \frac{CR_2}{CR_3} \quad (4)$$

If the times $T_1$, $T_2$, and $T_3$ occur within the late portion Z of curve 1, then the count rate ratio relationships are reversed as follows:

$$\frac{CR_1}{CR_2} > \frac{CR_2}{CR_3} \quad (5)$$

In the present invention, radiation count rates are determined for a plurality of time windows and these count rates are then employed to establish a ratio function for each pair of adjacent time windows. The ratio function may be the ratio of count rates determined during adjacent time windows, the logarithm of the ratio of such count rates, or the difference between the logarithm of the count rate determined during one time window and the logarithm of the count rate determined during the other time window. For the purpose of describing the invention herein, it will be assumed that the ratio functions are generated by employing the earlier count rate for each pair of adjacent time windows in the numerator. Thus, if the ratio function is equivalent to the numeric ratio, the ratio will always be greater than one or if it is equivalent to the logarithm of the ratio of the count rates or the difference between the logarithms of the count rates, the ratio function will always be positive. However, it will be understood that the reverse logic could be employed, i.e. the earlier count rate could be employed in the denominator thus leading to numerical ratios of less than 1 and negative logarithmic ratio functions. Regardless of which technique is actually chosen in practice, those skilled in the art will understand that it must be employed consistently throughout in carrying out the invention. In any case, the ratio functions are then compared with one another and at least one ratio function is selected which is derived from count rates falling within the straight line portion Y of curve 1, or if such a ratio function is not available, is derived from count rates falling in closest proximity thereto.

Turning now to FIG. 2, there is illustrated a pulsed neutron well logging system useful in epithermal neutron decay logging which embodies the present invention. The well logging system comprises a logging tool 14 which is suspended from a cable 16 within a well 17 traversing a subterranean formation of interest illustrated by reference character 18. The well normally will be lined by casing and filled with a fluid such as drilling mud, oil, or water. Signals from the logging tool are transmitted uphole via suitable conductors in the cable 16 to an analyzing and control circuit 20 at the surface. Circuit 20 operates on the downhole measurements as explained in greater detail hereinafter and applies one or more output functions to a recorder 22. Alternatively, circuit 20 could be located within the logging tool 14 and its output applied through cable 16 to recorder 22 at the surface. As the logging tool is moved through the hole, a depth recording means such as a measuring sheave 23 produces a depth signal which is applied to recorder 22, thus correlating the downhole measurements with the depths at which they are taken.

The logging tool 14 comprises a pulsed neutron source 24 and an epithermal neutron detector 26. The source 24 may be any suitable pulsed fast neutron source but preferably will take the form of a D-T accelerator comprising an ion source of deuterium and a target of tritium. Trigger pulses are periodically applied under control of the uphole circuitry to the deuterium source in order to ionize the deuterium. The deuterium ions thus produced are accelerated to the target by a high negative voltage and the resulting reaction between the deuterium ions and the tritium produces bursts of neutrons having an energy of about 14 Mev. The neutron bursts from the source 24 normally will be of a duration of 1 to 10 microseconds with an interval between the bursts of about 50 to 200 microseconds to provide a pulse repetition rate of 5,000 to 20,000 fast neutron bursts per second.

The detector 26 may be of any suitable type. For example, detector 26 may take the form of a helium-3 counter provided with a cadmium-gadolinium filter of the type described in the aforementioned patent to Mills. While only a single detector is shown, it is understood that the logging tool may comprise a plurality of detectors connected in parallel with one another and in series with the measurement circuitry. The output from detector 26 is amplified in the logging tool by means of an amplifier 26a and transmitted to the surface via suitable conductors in cable 16.

Figure 3:
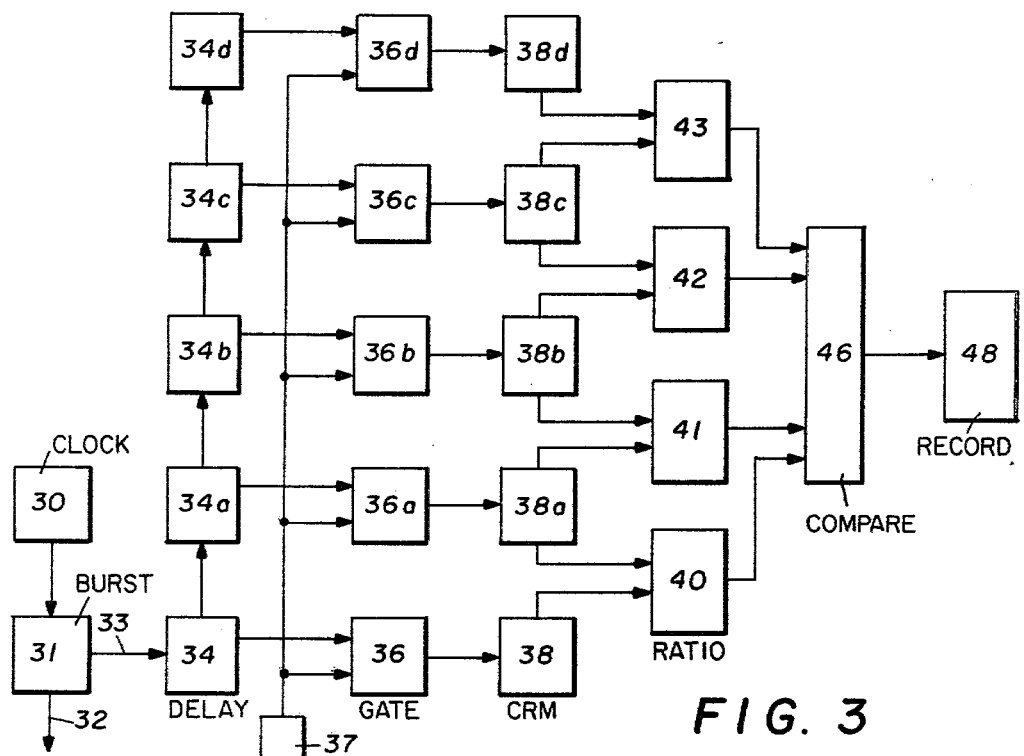
FIGS. 3, 4, and 5 and block schematics of circuits which may be employed in the invention.

Turning now to FIG. 3, there is shown one form of control and analysis circuitry suitable for use in the present invention. The system shown in FIG. 3 operates under control of a timing pulse source 30 such as a 10-KHz clock which is connected to a burst control unit 31. Burst control unit 31 has an output 32 leading to the control of the downhole neutron generator and an output 33 leading to a delay unit 34. Delay unit 34 may take the form of a monostable multivibrator which responds to each of the sync pulses from burst unit 31 to produce a time delay pulse. The time delay pulse from multivibrator 34 is a positive pulse of a duration equal to the desired duration of the first time window in which a count rate measurement is to be obtained. The output from multivibrator 34 is applied to a gating circuit 36 and also to a second monostable multivibrator 34a. Upon termination of the pulsed output from multivibrator 34, multivibrator 34a then produces a positive pulse of a duration equal to the desired length of a second time window and operates to control a second gate 36a. Additional gating circuits 36b, 36c, and 36d are provided which are under control of monostable multivibrators 34b, 34c, and 34d.

The output from detector 26 is applied to the uphole circuitry through an amplifier 35 and a pulse shaper 37. The pulse shaper 37 discriminates against signal output below a given low amplitude in order to reject the signals associated with "noise". In response to a detector output above the discrimination level, the pulse shaper produces a constant duration pulse.

The output from the pulse shaper is applied to gating circuits 36, 36a . . . 36d which, as noted previously, are under the control of the monostable multivibrators 34, 34a . . . 34d, respectively. Thus, the output from the multivibrator 34 is applied to gating circuit 36, thus allowing during this time the output from the pulse shaper 37 to be applied to a count rate meter 38. Upon termination of the positive pulse from multivibrator 34, multivibrator 34a then produces a positive pulse of a desired duration which opens gate 36a, allowing the output from the pulse shaper to be applied through this gate to a count rate meter 38a. The output from the pulse shaper 37 is then similarly applied in sequence through gating circuits 36b, 36c, and 36d to count rate meters 38b, 38c, and 38d, respectively. The count rate meters 38, 38a . . . 38d may be of any suitable type but typically will take the form of an RC averaging circuit with a relatively long time constant on the order of several seconds. Thus, the voltage output from the count rate meters 38, 38a, etc. are representative of the gated pulse rates from the pulse shaper 37 over a great many cycles of operation.

The outputs from the count rate meters are applied to ratio units 40, 41, 42, and 43. Assuming that each of the time windows controlled by multivibrators 34, 34a . . . 34d is of equal length, each of ratio units 40 through 43 may simply produce a DC voltage which is proportional to the numeric ratio between the outputs from the respective count rate meters. Thus, ratio unit 40 produces a voltage proportional to the ratio of the output from count rate meter 38 to the output from count rate meter 38a. Ratio unit 41 produces a DC voltage proportional to the ratio of the output from count rate meter 38a to the output of count rate meter 38b. Ratio units 42 and 43 similarly produce DC voltages representative of the ratios of the outputs from count rate meters 38b and 38c and 38c and 38d, respectively.

The outputs from ratio units 40 and 43 are applied to a comparator 46. Comparator 46 functions to compare each of the ratio functions with one another in order to select at least one ratio function which represents the closest approximation to the straight line portion Y of curve 1 shown in FIG. 1. For example, if the outputs from units 41 and 42 are equal, it is evident that the count rates measured by meters 38a, 38b, and 38c were obtained from the linear portion of the decay curve and thus either of the outputs from units 41 and 42 can be employed to generate a signal representative of the decay rate of the epithermal neutron population. This signal is then applied to a recording unit 48 where it is recorded in correlation with depth. If the output from each of ratio units 40 through 43 is less than the output from the next succeeding unit, then the time interval span by the time windows associated with count rate meters 38, 38a . . . 38d would fall within the early portion X of curve 1 or fall partially on portion X and partially on portion Y. In this case, the comparator functions to select the output from ratio unit 43 for use in generating the decay rate signal. Conversely, if the output from each of units 40 through 43 is greater than the output from the next succeeding ratio unit, then the comparator functions to select the output from ratio unit 40.

Figure 4:
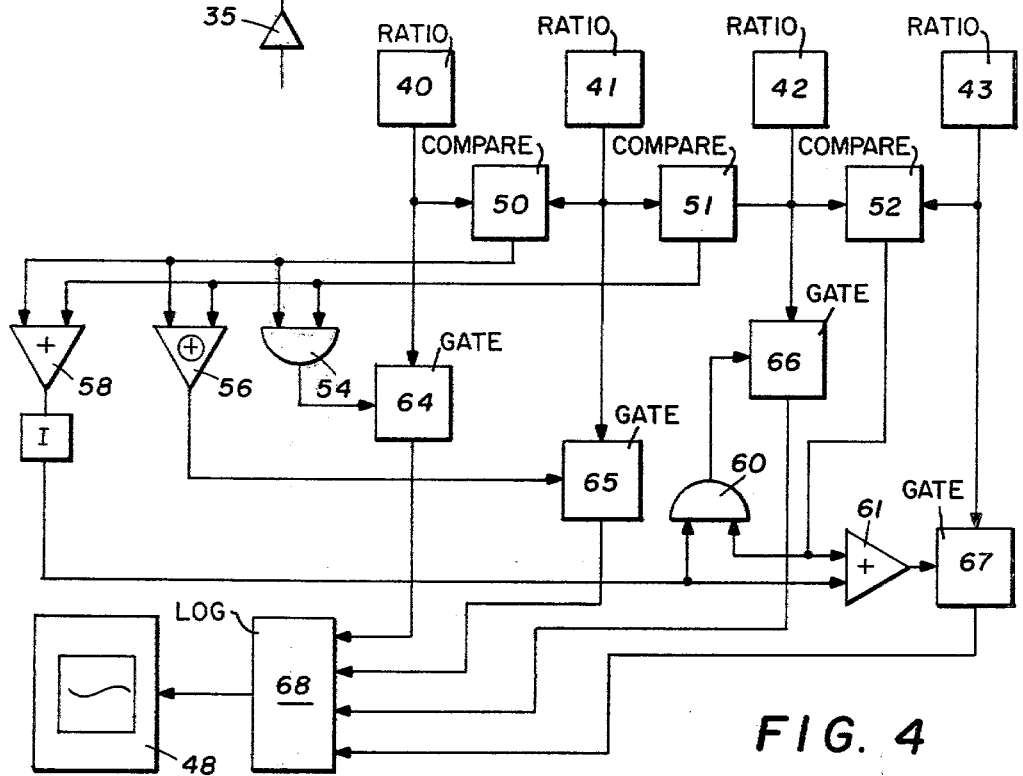

Turning now to FIG. 4, there is illustrated one suitable form of comparator circuit 46 which may be employed in carrying out the invention. As shown in FIG. 4, the outputs from ratio units 40-43 are connected to differential input analog comparators 50, 51, and 52. The logic of each of the comparators is such that if the signal strength of the "early" ratio unit is equal to or greater than the signal strength from the "later" ratio unit, the output from the comparator is a digital "true"

signal. If the output from the early ratio unit is less than the output from the later ratio unit, then the output of comparator 50, 51, or 52 is a digital "false" signal. Thus, considering comparator 50, the output from ratio unit 40 is the "early" ratio and the output from ratio unit 41 is the "later" ratio. With respect to comparator 51, the output from ratio unit 41 is the early ratio and that from ratio unit 42 then is the later ratio. Similarly with respect to comparator 52, the output from unit 42 is the early ratio signal and the output from unit 43 is the later ratio signal. The true and false signals from comparators 50, 51, and 52 may take any suitable form so long as they are consistent with one another. Typically, the "true" signal may take the form of a 5-volt output from the comparator and the "false" signal the form of a zero volt output.

The relationship between the relative values of the outputs of ratio units 40-43 and the output from comparators 50-52 is illustrated in the following table. In the table, the signal outputs from units 40, 41, 42, and 43 are indicated as $R_{40}$, $R_{41}$, $R_{42}$, and $R_{43}$, respectively. The comparator outputs from comparators 50, 51, and 52 are indicated by $C_{50}$, $C_{51}$, and $C_{52}$ with true indicated by "T" and false by "F".

TABLE I

| | $R_{40}$ | $R_{41}$ | $R_{42}$ | $R_{43}$ | $C_{50}$ | $C_{51}$ | $C_{52}$ | Select |
|---|---|---|---|---|---|---|---|---|
| 1 | < | < | < | | F | F | F | $R_{43}$ |
| 2 | < | < | = | | F | F | T | $R_{42}$ |
| 3 | < | = | = | | F | T | T | $R_{41}$ |
| 4 | = | = | = | | T | T | T | $R_{40}$ |
| 5 | = | = | > | | T | T | T | $R_{40}$ |
| 6 | = | > | > | | T | T | T | $R_{40}$ |
| 7 | > | > | > | | T | T | T | $R_{40}$ |
| 8 | < | = | > | | F | T | T | $R_{41}$ |
| 9 | < | < | > | | F | F | T | $R_{42}$ |
| 10 | < | > | > | | F | T | T | $R_{41}$ |

In Table I, the first three columns indicate the relationship between the ratio outputs. The next three columns indicate the outputs, whether true (T) or false (F), from comparators 50, 51, and 52, respectively. And the last column indicates the ratio output selected by the comparator circuit. Thus in sequence 1, for example, $R_{40} < R_{41} < R_{42} < R_{43}$ and the output from each of the comparators 50, 51, and 52 is false. In this case, the output from ratio unit 43 is selected to generate the decay rate signal.

In actual practice, the comparators 50, 51, and 52 may be designed so that ratio unit output signals which are close to each other within some tolerance level are considered to be "equal" and thus produce a "true" output. For example, comparators may be designed such that if the output from an early ratio circuit is equal to greater than the output of the later ratio circuit minus a relatively small tolerance value then the comparator would give a "true" output signal.

Returning now to FIG. 4, the outputs from comparators 50 and 51 are applied to an AND gate 54, an EXCLUSIVE-OR gate 56, and a NOR gate 58. The output from comparator 52 is applied to one input of an AND gate 60 and to one input of an EXCLUSIVE-OR gate 61. The other inputs of gates 60 and 61 are connected to the output of NOR gate 58.

The logic gates 54, 56, 58, 60, and 61 actuate control gates 64, 65, 66, and 67 which are connected to the outputs of ratio units 40, 41, 42, and 43, respectively. Thus, if the outputs from comparators 50 and 51 are both true, the AND gate produces a positive signal which functions to open gate 64 and apply the output from unit 40 to a logarithmic unit 68. Unit 68 produces an output voltage which is equal to the natural log of the applied input signal. The output from logarithmic unit 68 is then applied to the recording unit 48. Similarly if the output from comparator 50 is false while the output from comparator 51 is true, then the EXCLUSIVE-OR gate 56 is actuated to produce a voltage signal which is applied to gate 65. Gate 65 opens in response to the applied signal and the output from ratio unit 41 is applied to the logarithmic unit 68. If the outputs from comparators 50 and 51 are both false, a positive output signal is applied from NOR gate 58 to AND gate 60 and EXCLUSIVE-OR gate 61. If the output signal from comparator 52 is true (a positive voltage signal), then AND gate 60 operates to open gate 66 and apply the output from ratio unit 42 to logarithmic unit 68. If the output from comparator 52 is false, then the EXCLUSIVE-OR gate 61 produces an output signal to open gate 67 and allow the output from ratio unit 43 to be applied to logarithmic unit 68.

Figure 5:
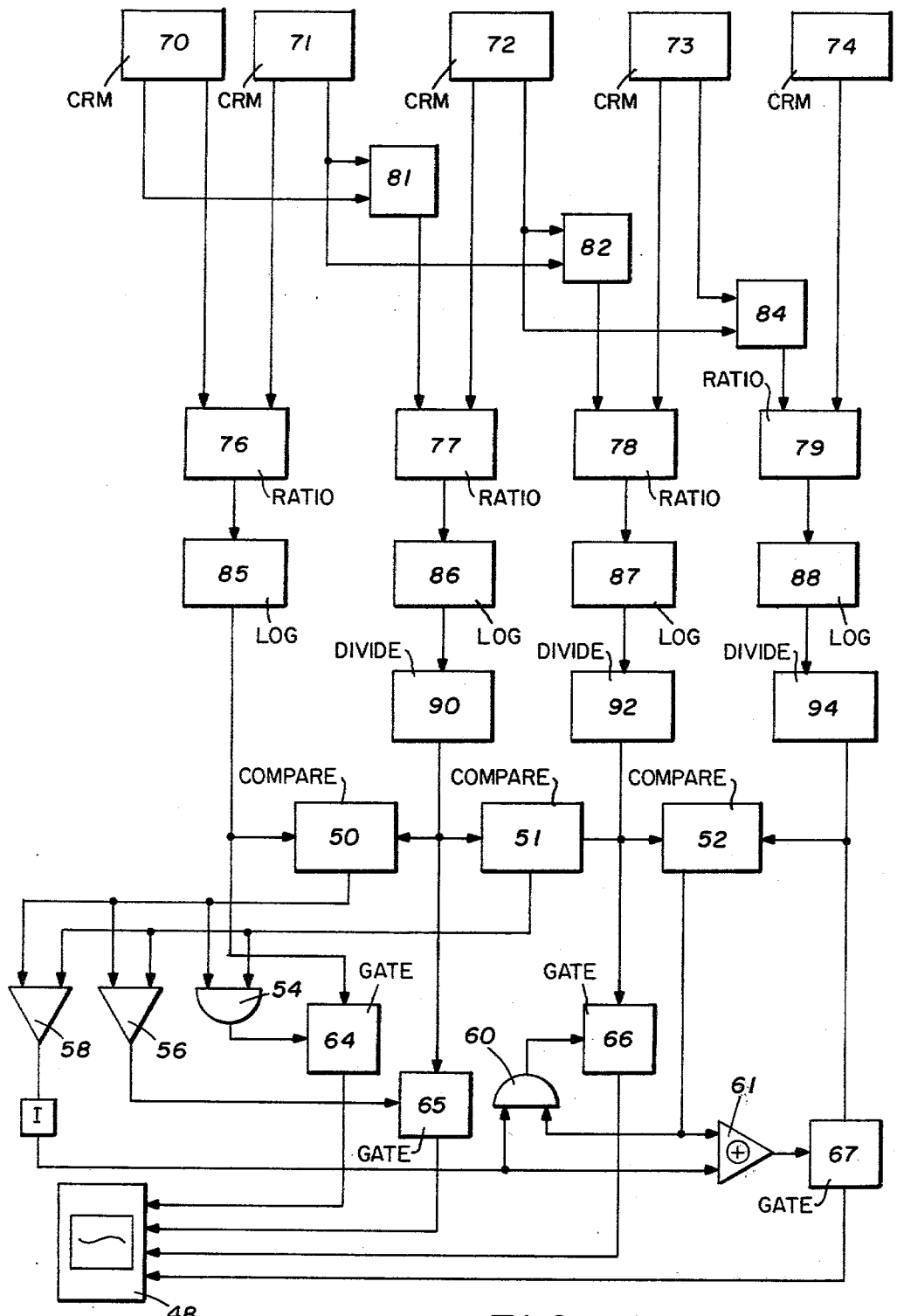

As noted in the aforementioned U.S. Pat. No. 4,097,737 to Mills, time windows of progressively increasing length may be employed to accommodate measurements of die-away curves which exhibit a wide range of decay rates. This same technique may be employed in the present invention and a plurality of ratio functions produced and compared to establish a ratio function representing an approximation of a linear portion of the semilog decline curve. Suitable circuitry for use in conjunction with time windows of varying lengths is illustrated in FIG. 5. As shown in FIG. 5, the circuitry comprises a plurality of count rate meters 70, 71, 72, 73, and 74. Each of the count rate meters is located in a separate measuring channel (not shown) and is connected through suitable gating circuitry to an appropriate radiation detector. The measuring channels provide for time windows of some basic time unit and of multiples of the basic time unit. For example, count rate meters 70 and 71 may be employed in measuring channels having time windows of 5 microseconds each. Count rate meter 72 is located in a measuring channel in which the duration of the window is 10 microseconds and count rate meters 73 and 74 are in channels having time window durations of 15 and 25 microseconds, respectively.

The outputs of count rate meters 70-74 are applied directly or indirectly to ratio units 76, 77, 78, and 79. Thus, the outputs from count rate meters 70 and 71 are applied to ratio unit 76. In addition, the outputs from count rate meters 70 and 71 are applied to a summing circuit 81 which produces a voltage output equal to the sum of the applied inputs. The output from summing circuit 81 is applied to ratio unit 77 together with the output from count rate meter 72. Similarly, the output from count rate meter 72 is applied along with the output from count rate meter 71 to summing circuit 82 the output of which is applied along with the output from count rate meter 73 to ratio unit 78. The output from count rate meter 73 is also applied to a summing circuit 84 together with the output from count rate meter 72. The output from this summing circuit is applied to ratio unit 79 along with the output from count rate meter 74.

Since the time windows associated with the several count rate meters are of different lengths, the outputs of the ratio units cannot be compared directly but must be adjusted to compensate for the difference in the time interval, t, in accordance with equation (2). Accordingly, the outputs of ratio units 76, 77, 78, and 79 are applied to logarithmic units 85, 86, 87, and 88 each of which provides a voltage output proportional to the natural logarithm of the applied input. The output from each logarithmic unit is then applied directly or through a divider circuit to a comparator circuit which as illustrated in FIG. 5 is identical to that shown in FIG. 4. Thus, the output from logarithmic unit 85 is applied to a comparator 50. The output from logarithmic unit 86 is applied to a divider circuit 90 where it is divided by a factor equal to the increase in time window length, in this case 2, and then applied to comparators 50 and 51. Similarly the output from logarithmic unit 87 is applied to a divider circuit 92 where it is divided by 3 and the output from logarithmic unit 88 is applied to a divider circuit 94 where it is divided by 5. The outputs of comparators 50, 51, and 52 are then applied similarly as described above with respect to FIG. 4 and the appropriate ratio function is selected and applied to recording unit 48. While in the embodiments disclosed in FIGS. 4 and 5 five time windows for count rate measurements are employed to develop four ratio functions, it will be recognized that a lesser or greater number of time windows may be employed in carrying out the invention. Obviously the greater the number of time windows, and thus the number of ratio functions generated, the more precise the characterization of the decay constant λ of the secondary radiation. Usually it is preferred in carrying out the invention to determine the radiation count rate during at least four time windows in order to establish at least three ratio functions. However, it will be recognized from relationships (3), (4), and (5) above that only three time windows need be employed in order to generate at least two ratio functions which can be compared to arrive at an approximation of the linear portion of the decline curve. In the case where the ratio functions are equal, the count rates were obtained on the linear portion of the curve and either ratio function may be employed to arrive at an accurate solution for λ. Where the second ratio function is greater than the first ratio function, it will be recognized from the previous discussion that the measurements were taken on the early portion of the curve and the second ratio function should be selected to provide the closest approximation to the linear portion of the curve. Conversely where the first ratio function is greater than the second ratio function, the count rate measurements were made relatively late in time and the first ratio function should be employed in order to provide the closest approximation to the correct value of the decay constant. Similar relationships between preceding and succeeding ratio functions obtain where greater numbers of count rate measurements are employed. In each case the ratio function selected should be substantially equal to or greater than a preceding or succeeding ratio function.

I claim:
1. In the logging of a well traversing a subterranean formation, the method comprising:
(a) irradiating said formation with a burst of fast neutrons whereby said fast neutrons enter said formation and are moderated therein to form a lower energy neutron population,
(b) during each of a plurality of time windows occurring subsequent to said fast neutron bursts selectively measuring the count rate of radiation attendant to said lower energy neutron population,

(c) establishing a plurality of ratio functions representative of the ratios of the radiation count rates measured during adjacent pairs of said time windows, (d) comparing said ratio functions with each other and employing at least one of said ratio functions to generate a signal representative of the decay rate of said lower energy neutron population, and (e) recording said decay rate signal in correlation with depth.

2. The method of claim 1 wherein said at least one of said ratio functions is substantially equal to or greater than a preceding or succeeding ratio function.

3. The method of claim 1 wherein said radiation count rates are measured during at least four time windows and are employed to establish at least three ratio functions.

4. The method of claim 1 wherein the radiation measured is epithermal neutrons.

5. The method of claim 1 wherein at least some of said time windows are of successively greater lengths and wherein at least one of the ratio functions established in step (c) is representative of the ratio of radiation count rates measured during one of said time windows and the radiation count rates measured during at least two immediately preceding time windows each of a shorter length than said one time window.

6. In a well logging system, the combination comprising:

(a) a logging tool adapted for insertion into a wellbore, (b) a primary radiation source in said tool for emitting repetitive time-spaced bursts of primary radiation, (c) detector means in said tool for detecting secondary radiation resulting from said primary radiation and producing output signals in response to said detected radiation, (d) a plurality of measuring channels for selectively producing a plurality of count rate functions representative of signals received from said detector means during successive time windows occurring between said bursts of primary radiation, (e) means responsive to said plurality of measuring channels for producing a plurality of ratio functions representative of the ratios of the radiation count rate measured during adjacent pairs of said time windows, (f) means for comparing said ratio functions and selecting at least one of said ratio functions to generate a signal representative of the decay rate of said secondary radiation.

7. The system of claim 6 wherein said primary radiation source emits bursts of fast neutrons.

8. The system of claim 7 wherein said detector means is responsive to epithermal neutrons.

9. The system of claim 8 comprising at least four of said measuring channels.

* * * * *